March 11, 1930.  F. S. BROADHURST  1,750,159
AUTOMOTIVE CONTROL SYSTEM
Filed May 8, 1928  3 Sheets-Sheet 1
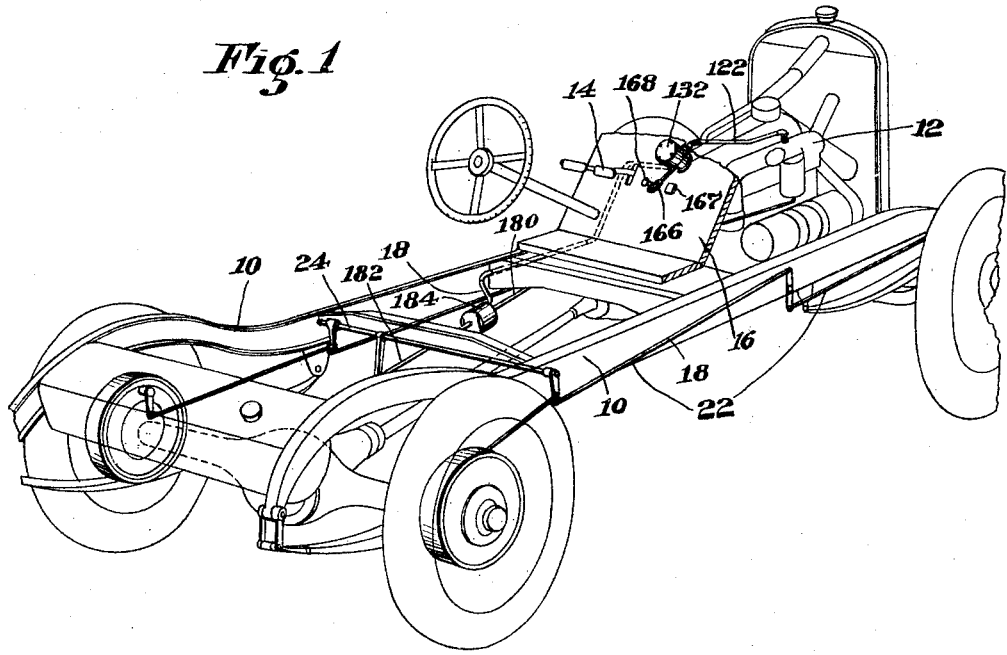
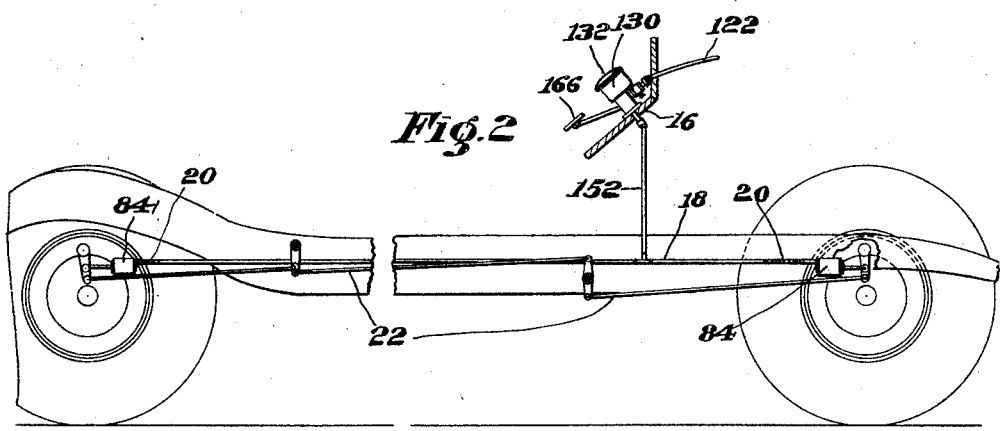
INVENTOR
Frank S. Broadhurst
BY
Warren G. Ogden
ATTORNEY March 11, 1930.  F. S. BROADHURST  1,750,159
AUTOMOTIVE CONTROL SYSTEM
Filed May 8, 1928  3 Sheets-Sheet 2
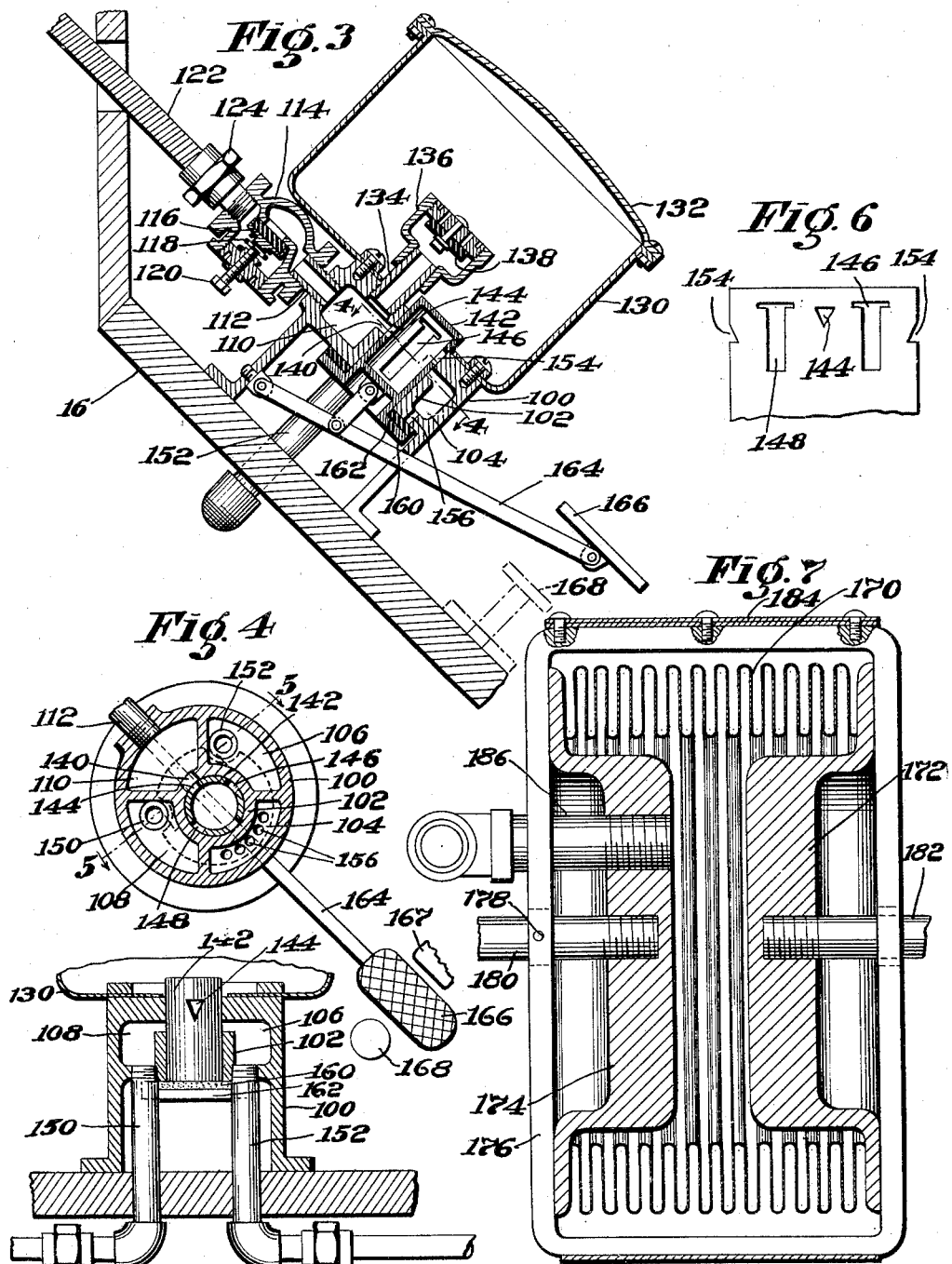
INVENTOR
Frank S. Broadhurst
BY
Harry G. Ogden
ATTORNEY March 11, 1930. F. S. BROADHURST 1,750,159
AUTOMOTIVE CONTROL SYSTEM
Filed May 8, 1928   3 Sheets-Sheet 3
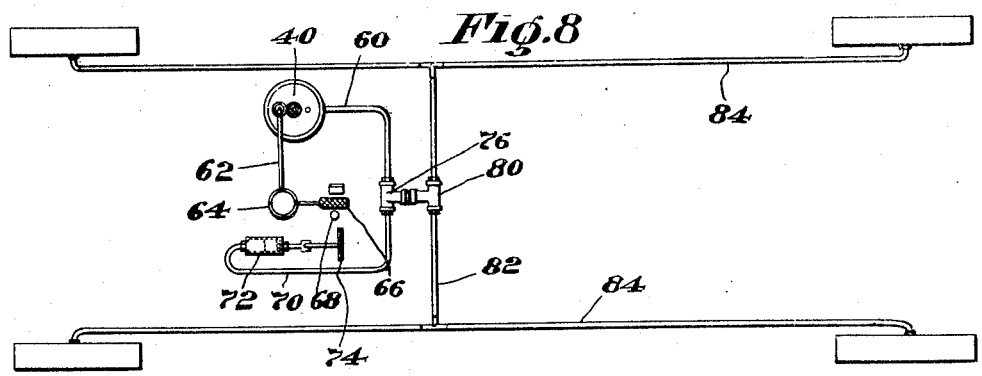
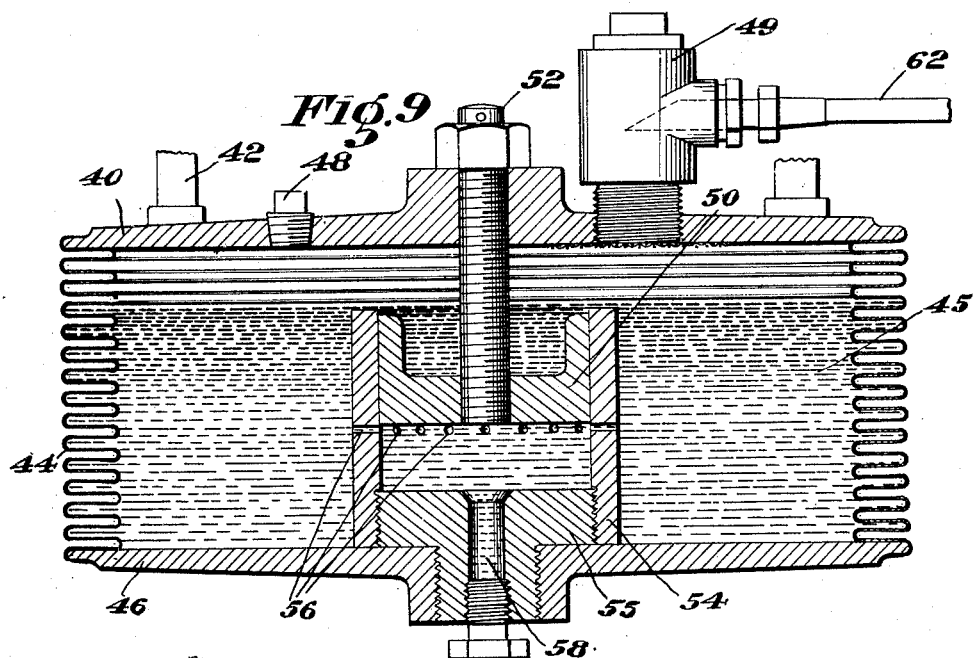
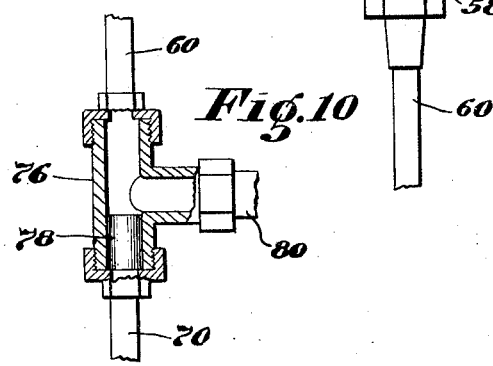
INVENTOR:
Frank S. Broadhurst
BY
Warren G. Ogden
ATTORNEY Patented Mar. 11, 1930

1,750,159

UNITED STATES PATENT OFFICE

FRANK S. BROADHURST, OF WATERTOWN, MASSACHUSETTS

AUTOMOTIVE CONTROL SYSTEM

Application filed May 8, 1928. Serial No. 276,049.

This invention relates to the control of automotive vehicles. In one respect, it comprises a system which includes a power actuated brake and a controlling device organized and arranged to assume automatically its brake-applying position. The application of the brakes, therefore, does not depend at all in its power upon the physical force of the driver, nor in its timing entirely upon his nervous reaction, since the system is self actuating in applying and setting the brakes. The driver's attention is required only for releasing the brakes by such action as is usual in setting the vehicle in motion, as depressing the accelerator or other light controlling movement.

It will be apparent that as a result of the novel combination above set forth I have produced an automotive vehicle that stops itself, that is to say, one which will be stopped by my system of control in the event of any lapse of attention or incapacitation on the part of the driver.

The controlling device is herein shown as associated with the accelerator and movable therewith without conscious effort of the driver. While the controlling device may be located at any desired point, association with the accelerator is desirable in that the act of depressing the accelerator in the usual manner is thereby made effective to release the brakes and hold them inoperative, while simultaneously with the upward movement of the accelerator cutting off the gas supply to the engine, the system is left free in its automatic action to apply the brakes. Complete removal of the driver's foot from the accelerator results in setting the brakes by the full power of the system and in maintaining this condition until it is desired again to put the machine in motion.

While it would be within the scope of the invention to secure the desired results by mechanical means, I prefer to employ a fluid-operated system. In another aspect, accordingly, the invention comprises a fluid-operated system of applying brakes and a controlling valve constructed and arranged to assume automatically its brake-applying position. As herein shown, the vacuum of the intake manifold of the engine is utilized and the controlling valve is continuously subjected to the vacuum thereof and urged thereby toward its brake-applying position. In releasing the brakes, therefore, the driver has merely to displace the unbalanced valve against the vacuum of the engine.

While it is desirable to utilize the full vacuum of the engine when the brakes are to be set, it is important to graduate or reduce the vacuum at intermediate stages to regulate the intensity of brake application. With this end in view and as an important feature of the invention, the controlling valve is organized to admit atmospheric pressure to the system increasingly as it is moved away from its brake-applying position. This provides an extremely sensitive and delicate brake-applying action operating smoothly and without effort between wide limits of intensity.

The vacuum of the engine is available while the engine is running but in order to provide means for actuating the brakes while the engine is at rest, my invention contemplates as another important feature, the inclusion of a permanent source of vacuum at some convenient point in the system. As herein shown, this comprises a vacuum cap arranged to be continuously exhausted when the engine is running but to be automatically sealed from the engine whenever the vacuum therein drops below that created by the engine under normal speed, and acting at all times to maintain effective in the system a vacuum commensurate with that furnished by the engine. The vacuum made available in this way is utilized to urge the controlling valve always toward its brake-applying position. The automatic action of the controlling valve can, therefore, be relied upon independently of the engine.

My invention may be embodied in any system of brakes including those operated mechanically and those operated by an hydraulic system and in all applications thereof, I prefer to employ a sylphon or a cylinder and plunger similarly actuated by fluid pressure. In installing my system in automobiles already equipped with mechanically operated brakes, a single sylphon may be cut into the brake system at any desired point as, for example, in the main brake rod, or individual sylphons may be provided for each brake. Movement of the sylphon element under the actuation of the engine vacuum automatically controlled as above outlined may then be utilized to displace the brake rod in precisely the same manner it has been formerly displaced by the foot treadle. In accordance with another important feature of the invention, I propose to mount the sylphon or its equivalent for bodily movement so that the actuation of the brake lever may be transmitted through it bodily if it is desired to use the foot brake, or the brake may be applied by movement of the sylphon element under power actuation.

Where my invention is embodied in a machine having hydraulic brakes, the sylphon or its equivalent may be utilized to create the required hydraulic pressure in the system by the power of the engine vacuum, and this may be to the exclusion of the foot operated brake actuating pump or not, as desired. An important advantage incident to the application of my invention to a system including hydraulic brakes is that the sylphon may be utilized as a reservoir from which to supply make-up oil to the system, thus eliminating the necessity for injecting additional oil from time to time, as has been necessary heretofore.

These and other features of the invention will be best understood and appreciated from the following description of a preferred embodiment thereof, selected for purposes of illustration and shown in the accompanying drawings, in which Fig. 1 is a view in perspective of an automobile chassis equipped with the system of my invention and including a single sylphon for operating all brakes;

Fig. 2 is a diagrammatic view, in side elevation, of a chassis in which each brake is operated by an individual sylphon;

Fig. 3 is a view in longitudinal section of the controlling valve and associated mechanism;

Fig. 4 is a view in transverse section of the valve mechanism on the line 4—4 of Fig. 3;

Fig. 5 is a view in longitudinal section, on an enlarged scale, through the valve;

Fig. 6 is a view of the development of the valve plunger;

Fig. 7 is a view in cross section of one form of sylphon which may be employed in the system;

Fig. 8 is a diagrammatic view illustrating application of my invention to an hydraulic brake system;

Fig. 9 is a sectional view, on an enlarged scale, of the sylphon used in connection with hydraulic brakes; and Fig. 10 is a sectional view of the transfer valve shown in Fig. 8.

The source of motion utilized for operating the brakes may comprise a cylinder and piston, a pressure chamber and diaphragm or a sylphon, which is a well-known commercial device including a corrugated sheet metal body and oppositely disposed heads which are collapsed together when the sylphon is exhausted. As a matter of mechanical detail, I prefer to employ in the system of my invention a sylphon and have illustrated in Fig. 7 a sylphon having characteristics adapting it particularly well for the present purpose.

The sylphon comprises the corrugated metal body portion 170 having the disc-shaped head 172 secured at one end and a corresponding head 174 at the other. Both of these heads are offset inwardly so as to reduce the volume of the sylphon and render it more sensitive and responsive to variations in internal pressure. An exhaust pipe 186 is threaded into the head 174 and opens into the interior of the sylphon. The sylphon is surrounded by a rigid frame 176 which is secured permanently to the head 174 by means of a rod 180 threaded into the head and fastened by a pin 178 to the frame. At its opposite side, the frame is perforated to permit the free passage of a brake rod 182 which is threaded into the other head 172 of the sylphon. The whole assembly is enclosed and protected by a sheet metal casing 184. It will be apparent from the foregoing description that if the rod 180 is moved toward the left, the whole assembly, including the brake rod 182, will be carried in that direction the head 172 being moved through its engagement with the frame 176. If on the other hand, the rod 180 remains at rest but the sylphon is exhausted through the pipe 186, the head 172 will move inwardly and, therefore, move the brake rod 182 independently of the frame 176. If this assembly, therefore, is cut into the main brake rod of an automotive vehicle, it may act merely as an intermediate link when the brake rod is moved by the treadle or it may act as a source of motion when a partial vacuum is created within it.

The arrangement above suggested is shown in Fig. 1, in which the side frames 10 of a chassis carry the brake rods 22 extending to the individual brakes, and these are operated through connection with the brake rocker shaft 24 and the main brake rod 182—180 from the brake treadle 14. The pressure within the sylphon is controlled by mechanism which will now be described, with particular reference to Figs. 3 to 6. A flanged cylindrical casing 100 contains an eccentrically disposed valve chamber 102 surrounded by four segmental chambers, of which the inner walls are formed by the eccentric cylindrical wall of the valve chamber and the outer walls thereof by the casing 100. The first of these chambers is designated by reference character 104 and has a series of air leak ports 156 in its bottom wall and a port leading to the valve chamber. The chambers 106 and 108 are located on opposite sides of the valve chamber and have inlet pipes 150 and 152 entering through their bottom walls, as shown in Fig. 5, and ports communicating with the valve chamber. The chamber 110 has a port 140 communicating normally with the valve chamber through the triangular port 144 of the valve.

The valve itself comprises a cylindrical plunger 142 arranged for movement in the valve chamber and having a laterally extending flange 160 at its lower end, between which and the bottom of the valve chamber is disposed a washer 162 of rubber or other flexible material. At one side, the plunger has the triangular inlet port 144 already mentioned and in its opposite side an oppositely disposed triangular port 154 which controls communication with the chamber 104, which may be termed the air leak chamber. In its side walls, the valve has oppositely disposed elongated ports 146 and 148, each with a transverse enlargement at its upper end. The lower end of the valve is exposed to atmospheric pressure as the casing 100 is slotted to receive an operating lever 164 connected through a short link to the bottom of the valve 142 and having an operating plate 166 at its outer end. At its upper end, the valve chamber opens into a vacuum cap, which will be presently described.

The chamber 110, which may be termed the exhaust chamber, is connected through the nipple 112, the valve 114 and the flexible pipe 122 to the intake manifold 12 of the engine. The valve 114 is a check valve, as shown in Fig. 3, having a valve disc 116 normally held against its seat by a compression spring 118 and limited in its opening by an adjustable stop 120. A union 124 furnishes convenient connection between the valve 114 and the suction pipe 122. It will be apparent from the foregoing description that the vacuum created in the intake manifold acts to displace the valve disc 116 and exhaust the exhaust chamber 110 and the valve chamber 102 to a point equal to the manifold vacuum. The speed at which this degree of vacuum is reached depends upon the amount of opening permitted to the valve disc 116 by the adjustable stop 120. If the engine stops or for any other reason the vacuum in the manifold is lost or falls below that created by the engine operating at its normal speed, then the check valve closes and the vacuum created in the chamber 110 and 102 is maintained.

For the purpose of maintaining a source of vacuum in the system independent of the engine, a vacuum cap 130 is secured to the top of the casing 100 and connected to the exhaust chamber 110 through the upstanding pipe 134 and the check valve 136, which is provided with a downwardly opening flexible disc 138. The vacuum cap 130 is closed by an air-tight cover 132 and by its connection with the exhaust chamber 110 will be at all times exhausted to the same degree of vacuum created therein. On account of the check valve 136, vacuum will be maintained in the vacuum cap independently of the vacuum of the exhaust chamber 110 and the rest of the system. Any loss of vacuum in the vacuum cap 130 will be made up by the operation of the engine whenever that is running but the vacuum so created will be maintained in the vacuum cap unless exhausted by repeated setting of the brakes while the engine is at rest.

As already noted, the valve chamber 102 opens into the vacuum cap so that the valve 142 is at all times subjected to the action thereof and at all times moved upwardly in the position shown in Fig. 3, wherein the valve disc 162 serves to shut off the air leak ports 156 and wherein the vacuum chamber 110 is placed in communication with the exhaust pipes 150 and 152 through the ports 144, 146 and 148. So long as the engine is running, the exhaust chamber 110 is continually exhausted and the vacuum cap 130 is maintained at the same degree of vacuum. The pipes 150 and 152 which communicate with the sylphon act continuously to exhaust the latter, collapsing the two heads thereof and moving the brake rod 182 with the full pressure of the system to its brake-applying position. The vacuum cap 130 at the same time is placed in communication with the chambers 106 and 108 so that its vacuum is available for the same purpose and would be so regardless of the manifold vacuum. The enlargement at the upper end of the valve ports 146 and 148 is for the purpose of establishing free communication between the vacuum cap and the chambers 106 and 108 when the controlling valve 102 is in its maximum brake-applying position, so that the full vacuum of the cap 130 may be available for setting the brakes.

From the foregoing description, it will be apparent that the valve 142 is unbalanced and maintained normally in brake-applying position by the vacuum of the engine or of the valve cap 130, or both. Movement out of this position is effected by the driver in depressing the lever 164. The operating plate 166 is narrow in its shape and located between the accelerator 168 and the usual foot rest 167, as shown in Fig. 4. Normally, it stands somewhat above the accelerator, as shown in Fig. 3, so that when the driver places his foot upon the accelerator he will naturally depress the lever 164 and displace the valve 142 downwardly sufficient to release the brakes. This occurs when the valve disc 162 opens the air leak port 156, permitting atmospheric pressure to reach the air leak chamber 104, and then through the triangular port 156 to enter the valve 142 and reach the chambers 106 and 108 through the ports 146 and 148. This permits the internal pressure in the sylphon to increase so that the movable head 172 is expanded and the brake rods move to releasing position. As the accelerator is depressed and the vehicle gains velocity, the valve 142 is carried to a still lower position in which the air leak ports are wide open and atmospheric pressure fully admitted to the chambers 106 and 108, while the port 144 is entirely closed and the engine vacuum limited to the chamber 110 and the vacuum cap 130. It will be noticed that under these conditions the vacuum in the chamber 110 will tend to intercept any air leakage in the valve 142 and thus preserve the full vacuum in the valve cap 130.

I have shown two exhaust pipes 150 and 152 as leading from the valve chamber 102. This arrangement is convenient where individual sylphons are employed for the separate brakes, as suggested in Fig. 2, and in such case the pipe 152 will be connected to a longitudinally extending pipe 18 on one side frame having a flexible connection 20 at each end to the individual sylphons 84, connected to and operating the individual brake arms. The pipe 150 will be similarly connected to pipes and sylphons on the other side frame of the chassis. In this installation, the foot operated brake levers 22 are shown as connected to the brake operating arms at separate points, so that the brakes may be operated either automatically through the sylphons or manually through the brake rods. Where a single sylphon is utilized for applying all the brakes, the pipes 150 and 152 may be led together and make a single connection.

In the foregoing description, I have described the application of my invention to mechanically operated brakes. I will now proceed to disclose one manner in which it may be advantageously applied to a system including hydraulically operated brakes. Fig. 8 illustrates diagrammatically hydraulic connections by means of the pipes 82 and 84 to the individual brakes of the vehicle. In accordance with the present practice, the hydraulic pressure required for setting the brakes in such a system is created in a cylinder 72 by the movement of a piston operated by a foot lever 74, the cylinder being connected through a pipe 70 to the system. This construction may be retained or not, as preferred, when using the system of my invention. As shown in Fig. 8, a sylphon is provided as an additional or alternative means of creating the hydraulic pressure required. The sylphon comprises a stationary head 40 and movable head 46 and the corrugated body portion 44. The sylphon may be partially filled with oil 45 through a supply opening, closed by a plug 48, in the head 40. The T 49 constitutes a vacuum connection of the sylphon and this communicates, through the pipe 62, with a valve 64 corresponding to the valve shown in Fig. 3 and controlled by a lever 66 adjacent to the accelerator 68. The internal pressure of the sylphon is thus controlled in precisely the same manner as already outlined.

The stationary head 40 of the sylphon is provided with a stationary but adjustable piston 50, mounted upon a threaded rod 52 set in a boss on the head 40. The movable head 46 carries a cylinder 54 which slides upon the stationary piston 50 when pressure is exhausted within the sylphon. The cylinder is provided with a series of inlet ports 56 through which the oil contained in the sylphon is admitted freely to the interior of the cylinder 54. The bottom of the cylinder is formed by a plug 55 having an axial passage 58 communicating with the pressure pipe 60. It will be apparent that when pressure within the sylphon is exhausted and the lower head 46 moves upwardly, the stationary piston 50 will first act to close the ports 56 and then act to subject the oil remaining in the cylinder, in the pipe 60 and the rest of the system, to pressure depending in intensity on the degree of vacuum created in the sylphon.

The pipe 60 leads to one end of a transfer valve, shown in Fig. 10, and comprising a T-shaped member 76 communicating at its outlet with a T 80 and the pipes 82 and 84, and at its other end with the pipe 70 from the cylinder 72. Within the transfer valve is a plunger 78 which is movable from one end to the other in accordance with the direction of pressure upon it and, as shown in Fig. 6, pressure created by the action of the sylphon has forced the plunger 78 into a position wherein it closes the pressure pipe 70 from the cylinder 72 and opens communication between the sylphon and the system. In this movement, it will be noticed that the plunger 78 will act to pump a small amount of oil into the manually controlled portion of the system, thus replenishing it and eliminating the necessity for supplying make-up oil. If the sylphon is not used but pressure is created by the manual operation of the piston in the cylinder 72, then the plunger 78 will be displaced to the opposite end of its travel and communication open between the pipe 70 and the system.

As herein shown, the intake manifold of the engine is utilized as a source of vacuum and this is convenient and satisfactory in most cases. It would not be outside the scope of the invention, however, to provide a

Having thus described my invention, what I claim as new and desire to secure by Letters Patent is:—

1. An automotive control system comprising a fluid-operated brake, actuating means therefor, and a movable controlling valve constructed and arranged to assume automatically its brake applying position.

2. An automotive control system comprising a fluid-operated brake, and pipe connections including a controlling valve subjected to the fluid pressure of the system and continuously urged thereby to its brake applying position.

3. An automotive control system comprising a vacuum-operated brake, a vacuum line to the intake manifold of the engine, and a controlling valve in said line continuously subjected to the vacuum thereof and urged thereby toward its brake applying position.

4. An automotive control system comprising a vacuum-operated brake, a vacuum line to the intake manifold of the engine, a controlling valve in said line continuously subjected to the vacuum thereof and impelled thereby toward its brake applying position, and treadle operated means for moving the valve toward its brake releasing position.

5. An automotive control system comprising a vacuum-operated brake, a vacuum line to the intake manifold of the engine, and a controlling valve in said line normally maintained by the vacuum in brake applying position and movable by the driver to admit atmospheric pressure to the system to release the brake.

6. An automotive control system comprising a vacuum-operated brake, a vacuum line to the intake manifold of the engine, an unbalanced valve in said vacuum line and having an inlet port open to atmospheric pressure, and valve operating means for moving the valve against the vacuum of the system.

7. An automotive control system comprising a fluid-operated brake, pipe connections including a controlling valve subjected to the fluid pressure of the system and continuously impelled thereby to its brake-applying position, and a valve-operating treadle located adjacent to the accelerator and movable in a coextensive path.

8. An automotive control system comprising a vacuum-operated brake, a connected source of vacuum, and an interposed controlling valve constructed and arranged to be operated by the driver to shut off the vacuum suction and simultaneously admit atmospheric pressure to the system in releasing the brakes.

9. An automotive control system comprising a vacuum-operated brake, a connected source of vacuum, an interposed controlling valve having a vacuum port and an air port of oppositely disposed V-shaped design, and means for moving said valve to close one port as the other is opened.

10. An automotive control system comprising a vacuum-operated brake, a vacuum pipe, an interposed controlling valve, and an automatically sealed vacuum chamber with which said valve communicates and by the vacuum whereof it is impelled always toward its brake-applying position.

11. An automotive control system comprising a vacuum-operated brake, a connected source of vacuum, an interposed controlling valve constructed and arranged to assume automatically its brake-applying position and movable by the driver to brake-releasing position, and means independent of said valve for regulating the degree of vacuum in said system.

12. Controlling mechanism for an automotive system comprising a casing having a valve chamber, an automatically sealed vacuum cap secured to said casing, outlet chambers within said casing, and a valve tending at all times to establish communication between said vacuum cap and said outlet chambers.

13. Controlling mechanism for an automotive system comprising a casing open to atmospheric pressure at one end and a vacuum cap communicating with the other end, an intermediate chamber for connection with a brake, a valve mounted within said casing and being impelled at all times to establish communication between said vacuum cap and intermediate chamber, and driver-operated means for moving the valve to establish communication between said intermediate chamber and atmospheric pressure.

14. Controlling mechanism for an automotive system comprising a chamber adapted to be maintained under vacuum, an air leak port, and a valve interposed between said chamber and port, having means for closing said port, and being impelled at all times by the vacuum of the system toward its position for closing the same.

15. Controlling mechanism for an automotive system including a source of vacuum, brake operating connections, and a valve having elongated ports for admitting the vacuum to said connections, said valve being impelled at all times toward its position of maximum port opening, whereby the full vacuum is made effective for applying the brake when the valve is unimpeded by the driver.

16. Controlling mechanism for an automotive system including a vacuum cap, a valve chamber communicating therewith at one end and open to the atmosphere at the other, and an intermediate chamber adapted to be continuously exhausted and to intercept leakage along the valve.

17. An automotive control system including a brake-operating sylphon having a cylindrical bellows member, and heads shaped to occupy a considerable portion of the space bounded by the bellows member thereby substantially reducing the cubic contents of the sylphon.

18. An automotive control system including a brake-operating sylphon having oppositely disposed heads, a frame embracing said heads, and a brake rod connected to one head, whereby it may be operated by the movement of said head relatively to the frame or by the movement of the head and frame together.

19. An automotive control system including a brake-operating sylphon having inwardly offset heads, a rigid frame bearing against the outer surfaces of said heads, a brake rod connected to one head independently of the frame, and a treadle rod for moving said frame bodily with its sylphon, whereby the brake rod may be moved by the sylphon while the frame remains at rest or by the movement of the treadle rod transmitted through the frame and the sylphon.

FRANK S. BROADHURST.